United States Patent [19]

Uruba et al.

[11] 4,191,375
[45] Mar. 4, 1980

[54] GAME BALL AND METHOD OF MAKING SAME

[75] Inventors: Vladimír Uruba; Zdeněk Figalla, both of Gottwaldov, Czechoslovakia

[73] Assignee: GALA, narodni podnik, Prostejov-Kraslice, Czechoslovakia

[21] Appl. No.: 895,370

[22] Filed: Apr. 11, 1978

[30] Foreign Application Priority Data

Apr. 13, 1977 [CS] Czechoslovakia .................. 2407/77

[51] Int. Cl.² ...................... A63B 41/10; A63B 45/00
[52] U.S. Cl. ................................ 273/65 EB; 156/170
[58] Field of Search ............. 273/65 EB, 61 R, 60 R, 273/65 E, 65 ED; 156/170, 169, 166

[56] References Cited

U.S. PATENT DOCUMENTS 2,995,311  8/1961  Holman .................. 273/65 EB X

FOREIGN PATENT DOCUMENTS 219376  1/1958  Australia .................. 273/65 EB

Primary Examiner—George J. Marlo

[57] ABSTRACT

A game ball having an inner bladder and a layer of yarn wound thereabout. The yarn layer is formed by a first strand of synthetic material and a second strand of natural material. As these strands are being simultaneously wound on the inner bladder, an adhesive is applied to the strand of synthetic material. Since the strands contact each other on the bladder, the strands of natural material absorb adhesive from that applied previously to the strands of synthetic material.

7 Claims, 3 Drawing Figures

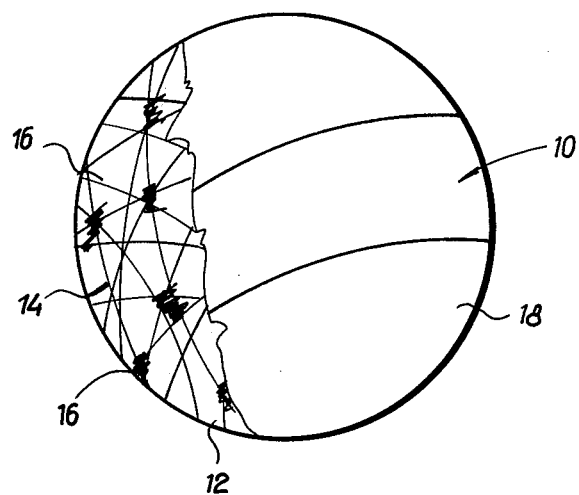
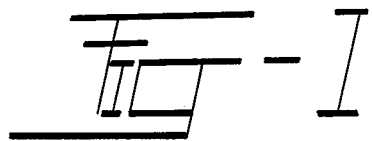
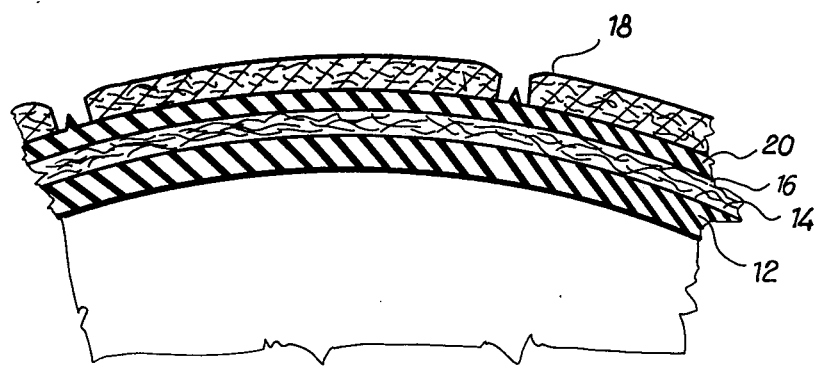
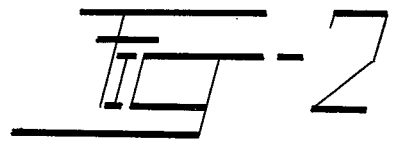

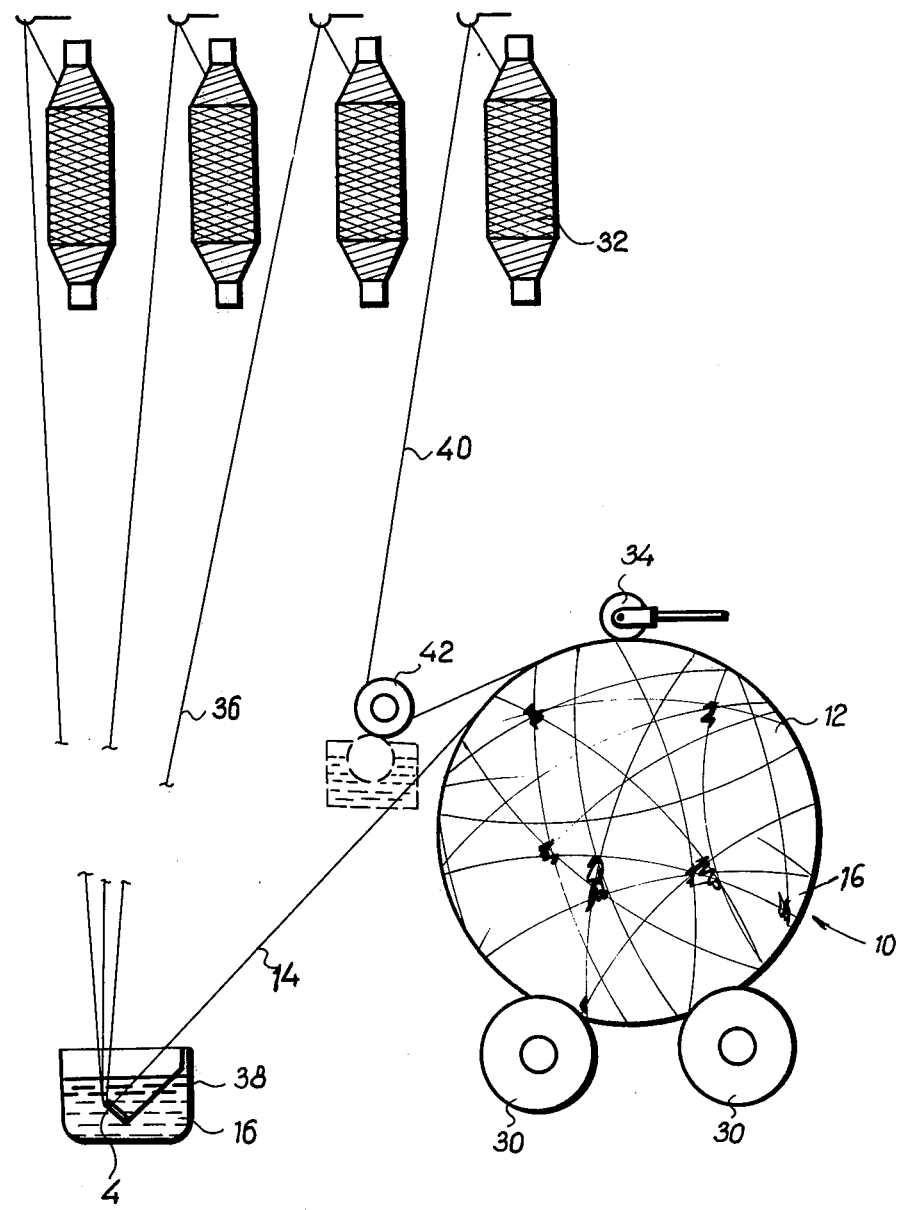

GAME BALL AND METHOD OF MAKING SAME

RELATED APPLICATION

This application is related to an application filed simultaneously herewith corresponding to Czech. applications PV No. 2406/77 and PV No. 2408/77, both filed Apr. 13, 1977 of which the present inventors are in part joint inventors with Veroslav Svub and Milan Burian. The subject matter of this application is incorporated herein as if more fully set forth.

BACKGROUND OF THE INVENTION

The present invention relates to game balls and in particular to such sport balls as footballs, soccer balls and the like, wherein strand materials are wound about a rubber bladder and then provided with an exterior cover. The present invention also relates to the manufacture of such game balls.

Molded game balls have been developed as a most recent substitute for the original, exclusively hand sewn game balls having covers made from individual segments, generally formed of natural leather. The manufacture of game balls to be considered for use in organized amateur and professional sports, is a time consuming task and involves an expensive method and a number of highly qualified operators to perform. In general, the method of producing molded game balls, requires the following steps: first, an inflated rubber bladder is wrapped into a reinforcing cover, made of textile segments. This textile cover, generally referred to as a "bag", is repeatedly reinforced by the application of a rubber compound which is then vulcanized. Thereafter outer cover segments, most made of leather, are adhesively bonded to vulcanized "bag". (See Czechoslovak Pat. No. 135824). Other recent methods of manufacture of molded gam balls abstain from the preparation of the so-called textile bag. According to these later methods, the inflated rubber bladder is provided with a relatively thick blanket of yarn or filament, wound about the same. (See for example U.S. Pat. No. 3,887,416 and French Pat. No. 1,488,920). These latter methods, on the one hand, provide a reinforcing effect tending to keep the game ball in its regular shape while on the other hand improve the flight characteristics of the game ball and its "bounce". The former aspect being of utmost importance in a maintaining satisfactory shape of the ball during extended play. The latter aspect is of importance in the control of the ball by the player during the game itself.

In order to achieve the aforementioned properties in the finished game ball, the precise network of yarn, wrapped in accordance with these later patents, require regular orientation in all directions around the circumference of the inflated bladder. This regular orientation must not be disturbed either during the subsequent wrapping of the yarn, or in the subsequent manufacturing steps. To effect this, it has been known to apply to the surface of the rubber bladder a layer of uncured rubber. This however does not guarantee that subsequent windings, or the subsequent handling of the ball, will allow the ball to be maintained stable since only the first layer of the winding is impressed into the layer of the uncured leather. The subsequent layers of yarn have a freedom of movement and slip over the previously deposited layers of the winding. It is only after the final vulcanization, that these yarns are bonded in place. In this connection, however, the final vulcanization has the sole effect of local stabilization of the winding yarns which might have previously been incorrectly or irregularly deposited upon the bladder surface. As a result, even after final vulcanization and binding of the yarn, the final effect in the ball is one of decreased quality.

It is the purpose of the present invention to remove the aforementioned disadvantages and to secure a regular deposition of the wound yarn about the supporting inner bladder.

It is the further object of the present invention to provide for the simultaneous local stabilization of the yarn as it is being wound. It is still another object of the present invention to provide a game ball, of the type described, which has a greater stability, more uniform quality characteristics, and a more uniform construction.

The foregoing objects together with the other objects and advantages of the present invention will be apparent from the following disclosure.

SUMMARY OF THE INVENTION

In accordance with the present invention a game ball is formed having at least an inner rubber bladder, and at least one continuous yarn system wound thereabout over which is located an outer surface covering. The continuous strand systems are applied to the bladder by having at least a major portion of the yarn carry a quick setting adhesive material, applied prior to winding.

The technical benefit of this construction lies in the fact that the regular deposition of the yarn is secured immediately and simultaneously with its placement and winding about the bladder as a result of the adhesive material properties carried by the yarn itself. As a result, the position of the yarn as it is deposited on the bladder or upon the previously wound yarn, does not change during further winding, or during further manufacturing steps required in the completion of the ball. The precise and regular distribution of the winding of the individual yarns, form a regular carcass for the game ball. In addition, the adhesive material tends to bind the yarn not only to the rubber carcass but to itself and particularly across the nodes or crossing points of the superimposed yarn. Still further, excess adhesive, tends to lodge between the interstices between the yarn so that a more uniform reinforcing of the inner rubber bladder is provided. As a result, a finished game ball, having this construction exhibits a uniform easy to control and precise bounce. These values of control, bounce, and feel, may be more easily made to conform to the regulations, issued by the respective sports associations for the individual types of game balls, formed, than those balls known to be made in accordance with any of the prior methods.

It is preferred that the windings be formed of at least one yarn being formed of a synthetic material such as that of a polyamides, or a combination of this material with other synthetic materials, or natural materials such as cotton. In accordance with the present invention it is also possible to provide a winding around the bladder formed of multiple strands of yarn, in which combinations of synthetic and natural materials may be used.

The adhesive may be formed of aqueous solutions or dispersions of materials having quick acting adhesive properties. The adhesive may be applied to the yarn prior to its winding around the bladder, by immersion of the yarn in a bath of such adhesive, or by roll coating the yarn as it is being drawn from its source onto the bladder. An aqueous dispersion or solution of adhesive is preferable, since such dispersions are completely free of toxic vapors, and may be more easily used. However, organic solvents can be used where the adhesive materials require their use.

It has been found that it is not necessary to have the yarn carry, continuously along its length, the adhesive material, particularly, when the yarn includes at least in part filaments of natural material. A certain excess of adhesive material on the surface of the synthetic fibres, which normally have a relatively low degree of suction, or absorption capacity, are sufficiently adequate for transference of enough adhesive material to the remainder of the yarn, so that during the actual winding about the rubber bladder, all of the fibres become sticky and adhesive.

When compared with manufacturing processes in which the aforementioned textile "bag" is glued to an inflated rubber bladder, the present method has a much greater productivity and a low cost due to the fact that the manual step of adhering the bag is avoided. The winding or depositing of the yarn according to present invention may be fully and automatically mechanised.

Further details of the present invention are set forth in the following description of the game ball formed in accordance with the present invention, and the method for carrying out the present invention.

BRIEF DESCRIPTION OF DRAWINGS

In the accompanying drawings:

FIG. 1 is a partial sectional view of a ball formed in accordance with the present invention;

FIG. 2 is a sectional view showing the ball construction;

FIG. 3 is a schematic view of apparatus for forming a ball, in accordance with the method of the present invention.

DESCRIPTION OF THE INVENTION

There is illustrated in FIG. 1 a ball, generally indicated by the numeral 10, having a round or circle shape, such as a soccer ball. The ball 10 comprises an inner rubber bladder 12 forming its core, about which is wound one or more continuous strands 14 of suitable material to a depth, forming a desired carcass. Preferably each strand is wound about great circles on the circumference of the bladder in a precession which deposits the strand in a uniform universally directed manner about the ball. The strands are provided with an adhesive 16 prior to their winding about the ball which causes the individual strands to adhere firmly and securely to the rubber bladder 12, as well as to each other. The adhesive 16 fills the interstices between the strands and surrounds the nodes cross over points of the superimposed strands and hardens to form the uniform cohesive carcass.

The winding is oriented in all directions so as to achieve a regularly deposited, thick network of windings upon the surface of the rubber bladder 12. The continuous curvature or precession of the individually deposited yarns always following the great circle of the circumference of the bladder. The individual yarns may be preferably formed of synthetic materials, such as for instance, polyamide fibre 100/24/N, or of natural fibres such as cotton yarn 68/2×2. Combinations or mixtures of these yarns may also be used. Preferably, the yarn may be obtained from commercial sources under the trade names or marks. Layers can be made from more than one continuous yarn, 3 yarns being an advantageous number. In this instance it is possible to use a combination of both synthetic and natural yarns each having different characteristics. That is one yarn may be made of the polyamide fibre, while another yarn made of another synthetic material, while a third being made of cotton.

When more than one yarn is wound around the surface of the inflated rubber simultaneous with the polyamide yarn the adhesive need not be coated on all of the strands or along the entire length of the polyamide yarn. It is sufficient that the adhesive be coated on a prevailing majority of the polyamid yarn or the natural yarn since, natural materials have a greater suction capacity or absorption capacity greater than that of the synthetic material. Thus, the adhesive will be able to be easily transferred from one yarn to the other. The local stabilization of the winding yarns would be obtained by this transference of a certain "excess" of the adhesive from one yarn to another and particularly from those yarns which have a lesser suction or absorption capacity to the yarn having the greater absorption capacity. The adhesive suitable for use herein can be an aqueous dispersion with 60% of a pre-cured natural rubber. The dispersion is diluted to approximately a 40% solids content before its application to the strand material. A suitable adhesive is sold by Revertex Ltd., London under the Trademark Reveltex LR. In the present specification the terms yarn strand, thread, continuous filament, rope, etc. are synonymously used to define those materials conventionally used for the formation of game balls of the type herein.

The strand material may be covered by an outer layer of leather or other material 18 simulating the outer ball. As seen in FIG. 2, the strand material may be covered first with an inner layer of adhesive material about which may be placed a first layer of skin 20, about which may be placed a further layer of leather or similar covering material. The outer surface of the skins or cover may be provided either naturally, or by subsequent molding to have the raised seams and surface contours or feel of natural leather, conforming to the requirements of the game the ball is to be used in.

Turning now to FIG. 3, the method by which the ball according to the present invention is made, is illustrated schematically. Using a hollow steel needle, a rubber bladder is inflated by means of pressurized air to a predetermined maximum diameter. The bladder is then fixed on a rotating support or mandrel such as conical rollers indicated by the numerals 30. The yarn is fed from a spool or cone 32, over a series of feed guides, to a presser roll 34 where they are laid upon the bladder. As illustrated in FIG. 3, several of the yarns 36 preferably polyamide or other synthetic yarn are passed through a bath 38 of suitable adhesive 16 by totally immersing the running yarn through the bath prior to its application to the bladder. These yarns 36 are twisted or combined into a single strand 14 prior to application on the bladder. A single yarn 40 of natural material such as cotton or silk is passed over a guide roller 42 and applied to the bladder simultaneously with the strand 14.

An alternate arrangement by which an abutting coating roller, immersed in the bath of adhesive contacts the presser roller thereby applying the adhesive directly to the strand prior to its pressing about the ball is shown in dotted lines in FIG. 3. Other and similar arrangements can be employed all well known to those skilled in the art. As pointed out earlier, when a plurality of strands are wound about the surface of the inflated rubber bladder simultaneously, the coating application of the adhesive material need not be made to each of the strands. A choice and selection of the strands to be provided with the adhesive can be made depending upon the nature of the material to be used. It is, of course, preferred that at least one of the strands be made of polyamide material, and if so, this polyamide material be used as the basic strand to which the adhesive is applied.

The strands are pressed by means of the pressing rollers onto the surface of the rotating bladder. The presser rolls themselves may cause rotation of the bladder. The presser rollers act to apply the strands directly to the surface of the bladder, and lock and secure the strands in the position on which they are wound, due to the co-action with the adhesive material. At the same time absorption of the excess adhesive materials occurs, the result of which is that strands of the natural fiber, or other strands which are not supplied with adhesive, having a greater absorption characteristic, absorb some of the adhesive. The combined winding of the synthetic and natural fibers by the method according the present invention removes an undesired agglomeration of any of the adhesive particles on any one given strand and particularly the agglomeration of excess adhesive at the nodes or the crossing points of the strand. Further, the pressing of the strands, and the use of the additional strand material reduces the possible formation of undesired solid adhesive particles which might otherwise form projections on the surface of the bladder.

It has been found that the overall quantity of strand material necessary to complete the reinforced winding of a single game ball, either soccer or football for example, is between 10,000 to 20,000 meters in length. This corresponds also to the consumption of adhesive material, related to its solid content, equal to approximately four to ten grams. Suitable material of this type being the 40% dispersion of natural rubber, previously indicated as being sold commercially under the Trademark Revultex LR.

The winding of the yarn about the carcass is generally made to a depth of between 2 mm. to 5 mm. whereafter the winding is stopped, and the carcass comprising the rubber bladder and its outer layers of strand material is dried for about thirty (30) minutes, in order to evaporate a substantial portion of the water content of the adhesive. Upon drying of the carcass, ironing of the bladder is done in a smooth mold, the diameter of which is slightly enlarged when compared with the diameter of the inflated rubber bladder itself. The enlargement corresponding substantially to the value of the thickness of the strand deposited upon the bladder surface. As a result of this ironing or molding, the outer surface of the carcass can be made with a relatively smooth or uniform layer of adhesive. This layer can be embossed with simulated stitchings, grooves, and seams, if desired.

The ironing mold for example, has a diameter of 201 mm. when the rubber bladder is inflated to 180 mm. For an inflated rubber bladder of 200 mm. diameter an ironing mold would be used of 204 mm. diameter. Temperatures ranging from 100 to 110 degrees centigrade are used in the ironing step. This ironing or molding step has the effect of local stabilization of the strand materials in their previously acquired pattern and stablization of the yarns on their surface by the simultaneous vulcanization and eventual coagulation of the adhesive dispersed about the surface. In the ironing step the remaining portion of the humidity or moisture from the carcass, is completely evaporated. The carcass is thereafter let stand to cool prior to its passage into the further manufacturing steps. To form the carcass of the game ball shown in FIG. 2, the carcass, after having been ironed and preliminary molded, is marked thereon in a visible manner with characteristic constructional or design features of the ball to be formed, including impressions of the grooves, raised seams and stitchings, and is thereafter coated to a width of about 15 mm. with a layer of an adhesive. The adhesive may be the same as that used to apply the strands to the rubber bladder, or it may be a different adhesive.

After this layer of adhesive is dried, rubber ribs are adhesively bonded across the imprinted grooves whereupon the prepared profile is pressed into a mold provided with grooves in which the outer surface or cover segments, to be applied to the carcass are located. Thereupon, the carcass and the reverse sides of the surface segments are coated with a layer of adhesive and as soon as the adhesive has dried, the cover segments are applied under pressure to the carcass placed into the grooves of the mold, and the mold closed. In this final step the game balls are again molded under heat of a temperature preferably in the range of between 100 to 150 degrees centigrade depending upon the type and heat resistance of the outer surface materials being used to cover the carcass.

The segments of outer material used to form the cover of the carcass can be formed of various natural leathers which is preferrable, or synthetic leathers, if desired. The synthetic leathers are preferably provided with an inner textile backing laminated to the face side of the synthetic leather. This textile backing is most helpful in adhereing the synthetic leather to the carcass itself. The use of rubber outer coverings can also be used.

In another embodiment of the method by which the game ball is formed, the preliminarily ironed carcass of the ball, that is the rubber bladder to which the strand winding is applied, may be coated with a layer of adhesive based, for example, on natural rubber. A sheet of specially modified rubber mixture, may be separately prepared. The reverse side of this sheet which is to be applied to the carcass is activated by means of an organic solvent, for instance, by means of gasoline or other petroleum solvent. Thereafter, this prepared sheet is applied to the game ball carcass, the solvent activating the adhesion between the natural rubber layer and the prepared sheet. The carcass with the sheet applied thereto is then inserted in a cold mold and pressed under suitable pressure to cure the adhesive. The impression of grooves, seams, and stitchings, characteristic of the profile of the game ball can be created in the mold walls, and formed on the outer surface of the completed ball during this cold molding process.

After the cold molding step, the ball is again coated with a layer of adhesive, based upon natural rubber. Simultaneously, this same adhesive is applied to the reverse side of the outer covering members or segments, which as before can be either leather or leather substitute. A period of about 20 minutes is required to permit the natural rubber adhesive to partially cure. Thereafter, the outer cover segments are placed upon the carcass conforming to the precisely imprinted grooves formed thereon for their reception during the cold molding process. Finally, the game ball is cured, that is vulcanized, at temperatures again ranging from 100 to 150 degrees centigrade, depending upon the type and heat resistance for the outer material used to form the cover.

According to still another embodiment of the present method, it is possible to proceed in such a manner that the sheet or profile rubber layer, which in the preceding embodiment is cold molded, is vulcanized and to which cuttings, i.e., strips or pieces of outer cover material have been bonded. This procedure by which the leather covers may be pre-set in the inner rubber skin is of a great advantage due to the fact that the final ironing may be performed at a lower temperature. This is of advantage especially when the outer covering materials have a very low degree of heat resistance, such as fine natural leather. The use of high temperatures during the final vulcanization step can be avoided.

The following is a specific example of a ball formed in accordance with the present invention and in accordance with the method of the present invention.

A rubber bladder is prepared which is inflated to a diameter of 196 mm. in such a manner as to guaranty the required roundness within a tolerance of plus or minus 2 mm. The surface of this bladder is reenforced with a yarn winding. The winding is accomplished by manually anchoring the yarn strand to the bladder surface and subsequently, winding the strand around the bladder following the maximum or great circle lines on the circumference of the bladder. Four separate strands are wound simultaneously. Of these four strands three are of polyamid yarn sold under the commercial trademark PAD-100/24/N. Two strands of this polyamide yarn are passed through a latex bath comprising 20 to 25 percent of the pre-cured adhesive of the type Revultex LR. Sufficient adhesion of the strand to the bladder surface and eventually to the precedingly wound layers of the windings is secured by the use of this adhesive. The remaining strand of the polyamide yarn and the remaining non-polyamide yarn, in this instance, cotton or natural silk are wound simultaneously with the previously mentioned two strands of polyamide, yarn, without passing through or without having the adhesive applied to it prior to winding. This is to prevent any excess absorption of the latex adhesive into the polyamide yarn. Whatever excess occurs, is transferred into the cotton or silk yarn and secures the uniform distribution of the solvent and of the latex solid across the winding surface. This distribution of the solid moisture and adhesive secures the absorption properties of the natural fibers, preferably the fibers of regenerated cellulose.

In this example, the game ball requires approximately meters of winding yarn, taking about 12.5 minutes to complete. The yarn covers the bladder to the required depth resulting in a carcass of a desired strength and shape for the finished game ball. After winding of the inflated bladder, the moisture content of the adhesive is allowed to evaporate freely under ambiant conditions for about 30 minutes. Whereupon the carcass thus formed is pressed and ironed in a smooth mold heated to a temperature of about 100 to 110 degrees centigrade for about one minute at a pressure of approximately 5 atmospheres. The outer layers and surface coverings are then applied.

For further details of the method and apparatus for winding the ball and completing its outer covering and shape, reference can be made to the aforementioned related application.

It will be seen from the foregoing description that according to the present invention, a new and novel ball construction is obtained and a new and novel method. Various modifications, changes, etc., have been suggested, others will be obvious to those skilled in the present art. Accordingly, it is intended that the present disclosure be taken as illustrative only and not limiting the present invention.

What is claimed is:

1. A method of making a game ball having an inner rubber bladder comprising the steps of simultaneously winding about said bladder a plurality of yarns in at least one layer, at least one of said yarns being formed of a substantially continuous strand of synthetic material and at least one of said yarns being formed of a substantially continuous strand of natural material, applying to said at least one strand of synthetic material along a major portion thereof an adhesive, prior to its winding on said bladder.

2. The method according to claim 1 wherein said synthetic material is polyamides.

3. The method according to claim 1 wherein said natural yarns are fee of adhesive prior to winding.

4. The method according to claim 1 wherein said adhesive is applied by passing the yarn through a bath thereof.

5. The method according to claim 1 wherein said adhesive is applied by roll coating the same to the yarn.

6. The method according to claim 1 including the step of covering said layer of yarn with an outer shell.

7. A game ball made in accordance with claims 1, 2, 3, 4 or 5.

* * * * *